Oct. 29, 1968     A. A. ANASTASIO ET AL     3,407,777
FAIRING SUPPORT RING
Filed April 25, 1967
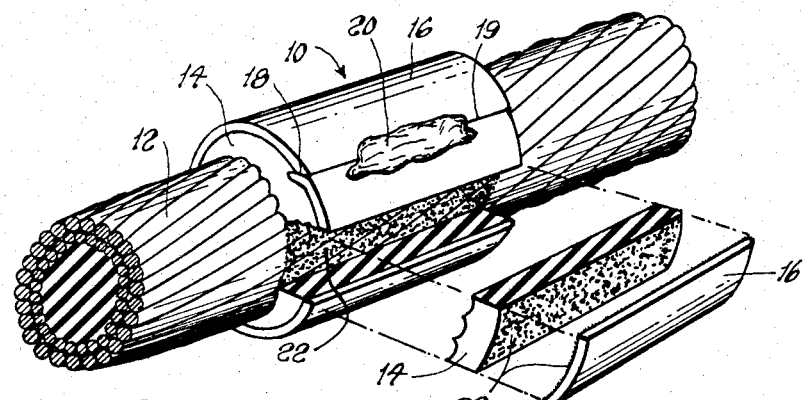
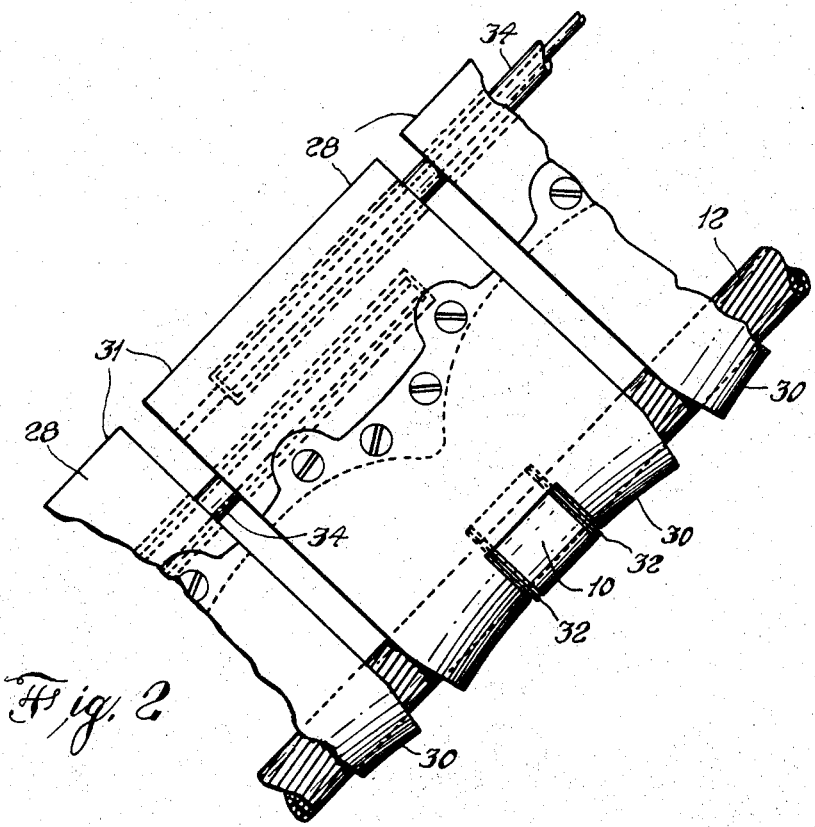
INVENTORS.
ANDREW A. ANASTASIO
CHRISTOPHER D. FRANCY
BY Philip Schneider
Louis B. Appleba
ATTORNEYS

United States Patent Office

3,407,777
Patented Oct. 29, 1968

3,407,777
FAIRING SUPPORT RING
Andrew A. Anastasio and Christopher D. Francy, Brooklyn, N.Y., assignors to the United States of America as represented by the Secretary of the Navy
Filed Apr. 25, 1967, Ser. No. 634,802
6 Claims. (Cl. 114—235)

ABSTRACT OF THE DISCLOSURE

A support ring bonded around the circumference of a cable for supporting cable fairings and the like. The ring comprises a layer of rubber bonded to the cable and a layer of stainless steel bonded to the rubber. The steel layer is formed with an overlapping joint at which point the joint is tack-welded.

---

The invention described herein may be manufactured and used by or for the Government of the United States of America for governmental purposes without the payment of any royalties thereon or therefor.

BACKGROUND OF INVENTION

This invention relates to support rings and especially to a support ring bonded to a towline cable for supporting the cable fairings.

In towing a submerged object behind a ship, it is frequently desired that the object remain in a fixed, known position behind the ship. Also, to reduce the amount of drag produced by a towline cable, fairings are mounted along the length of the cable, the fairings being easily rotatable around the cable.

It has been found, however, that in a set-up as described above, the towline exhibits a tendency to kite, thereby swinging the towed object away from its desired position directly behind the ship. A possible explanation for the phenomenon of kiting is that the drag forces on the fairing sections create binding between adjacent sections preventing them from swiveling freely around the cable to conform with the water flow and thus producing laterally directed forces on the cable.

It is believed that separation of the fairings at twenty-foot intervals prevents the development between fairings of sufficient longitudinal force along the cable to enable fairing binding to occur.

Accordingly, an object of the present invention is to prevent binding between fairing sections which are arranged along the length of a towcable.

Another object is to provide support for fairings arranged along the length of a towcable.

SUMMARY OF INVENTION

The objects and advantages of the present invention are accomplished by bonding supporting rings at fixed intervals along a towcable. Each supporting ring comprises a layer of resilient material next to the cable and a layer of rigid material surrounding the resilient material. The resilient layer is bonded securely to both the outer surface of the cable and the inner surface of the rigid material. For added strength, the longitudinal joint in the rigid material is secured by welding.

Other objects and advantages will appear from the following description of an example of the invention, and the novel features will be particularly pointed out in the appended claims.

BRIEF DESCRIPTION OF THE DRAWING

FIG. 1 is an isometric illustration of the invention on a section of towcable; and FIG. 2 is an illustration of the relationship between the towcable, some fairings and a supporting ring.

DETAILED DESCRIPTION

FIG. 1 shows a supporting ring 10 mounted on a section of towcable 12. The supporting ring 10 comprises a first, or inner, layer 14 of a resilient material such as a nitrile rubber compound and a second, or outer, layer 16 of rigid material such as stainless steel. Both of these materials should and do possess another quality which is important for marine applications, namely, the quality of high resistance to the corrosive action of seawater. This quality is, of course, not essential in non-marine applications of the invention.

The resilient layer 14 is bonded to the outer surface of the towcable 12 preferably by a suitable adhesive 22 such as one of those taught by U.S. Patent 2,522,135 or by Thixon P-4 Adhesive manufactured by Dayton Chemical Products Lab., Inc., of West Alexandria, Ohio. It is also bonded to the inner surface of the rigid layer 16.

The rigid layer 16 is formed with an overlap 18 at the longitudinal joint 19 and the joint 19 is fastened together by a tack-weld 20. The overlap 18 is necessitated by the weakening effect which would occur in the rigid layer 16 if the ends of the layer were simply butted together and then welded.

FIG. 2 illustrates how the fairings 28 which are each about a foot in length, are swivel-mounted on the towcable 12. Each fairing 28 has a stainless steel nosepiece 30 and a polypropylene rear section 31 which is bored to encompass an aligner rod 34. Each aligner rod 34 fits into two adjacent fairings 28.

The supporting ring 10 is mounted on the cable 12 at the middle of the nosepiece of a fairing, the nosepiece being suitably shaped to accommodate the ring 10. It is preferable, although not essential, to insert a thrust washer 32 at each end of the supporting ring 10. Supporting rings 10 are located approximately 20-foot intervals along the cable 12.

The dimensions of each supporting ring 10 are approximately two inches in length and approximately ⅛ inch in radial depth. The small radial depth is necessary because the entire cable assembly passes through V-shaped sheaves on the towing ship and bumps on the cable would cause reeling difficulties.

The resilient layer of the ring is necessitated by the changes in diameter of the towcable as it is reeled out. A completely rigid supporting ring would not remain bonded to the cable under this condition. The rigid layer is required because of the necessity to distribute the load over the entire area of the bond between the resilient layer and the cable surface. If it were not present, the downward pressure of the fairings would act mainly on the top of the resilient layer, ripping it away from the cable surface at this point first and then ripping it away progressively downward.

The best nitrile rubber compound which has been found so far is the following:

| Ingredients | Concentration, phr. |
|---|---|
| Butadiene-acrylonitrile copolymer (e.g., Hycar 1042) | 100 |
| Fast extruding furnace carbon black (e.g., Philblack A) | 60 |
| Zinc oxide | 5 |
| Stearic acid | 1 |
| Magnesium oxide (e.g. Maglite D) | 4 |
| Di-ortho-tolylguanidine (e.g., D.O.T.G.) | 0.5 |
| 2-mercaptobenzothiazole (e.g., Captax) | 1.5 |
| Sulphur | 2 |

The method of preparation is as follows:

Band the polymer. Add the zinc oxide to half of the carbon black and mill mix it into the polymer. Mix the stearic acid, the magnesium oxide, and the di-ortho-tolylguanidine with the other half of the carbon black and mill mix it into the polymer mixture. Add the 2-mercaptobenzothiazole and the sulphur. Cut, refine and sheet off the complete mixture to a thickness of 3/32 of an inch.

The supporting ring 10 is formed and bonded to the towcable 12 in the following manner:

(1) *Preparation of the cable*

(a) Wipe the excess grease and dirt off the application site on the towcable.

(b) Wirebrush the area.

(c) Degrease the area with toluene or benzene followed by acetone. Thoroughly dry the degreased area with a heat-gun-type forced-hot-air blower.

(d) Brush on an 80% by volume mixture of concentrated phosphoric acid and water. Allow the acid to remain on the surface of the cable for approximately one minute before washing it off with water. Again thoroughly dry the cleaned area.

(e) Apply one brush coat of adhesive and allow it to dry. Do not use the heat gun.

(2) *Preparation of metal ring*

(f) Sandblast the inner surface of the preformed stainless steel ring.

(g) Degrease the sandblasted surface as in step (c) above.

(h) Apply one brush coat of the adhesive as in step (e) above.

(3) *Preparation of rubber*

(i) After the adhesive has thoroughly dried, the metal ring is spread open so that it can be easily placed around the cable. The sheeted rubber is cut into strips two inches wide and one layer of rubber is placed inside the metal. Any excess rubber extending into the stretched opening of the ring is trimmed away.

(j) The metal ring and the rubber are then slipped over the cable at the prepared location.

(4) *Molding of the supporting ring onto the cable*

(k) The cable and supporting ring is placed on the lower half of a split, preheated ring mold. The upper half of the mold is then placed over the supporting ring assembly. The ring mold is now placed in an electrically heated press for a curing period of ten minutes at 307 degrees F. under a ram pressure of 36,000 pounds.

(l) Upon completion of the curing period, the mold is removed from the supporting ring and the supporting ring is immediately cooled with water to stop the cure.

(m) The ring is now dried and the lap joint in the ring is joined by a 3/4 inch long arc weld.

The properties of the above-mentioned nitrile rubber compound, which can be considered to be approximate minimum requirements, are as follows:

| | |
|---|---|
| Modulus at 100% elongation _____ p.s.i.__ | 1140 |
| Ultimate tensile strength _____ do__ | 3730 |
| Ultimate elongation _____ percent__ | 250 |
| Tear strength _____ lbs./inch thickness__ | 20 |
| Hardness _____ Shore A__ | 75 |
| Specific gravity _____ | 1.24 |
| Volume swell after six months of exposure in ocean _____ percent__ | 3 |

It will be understood that various changes in the details, materials, and arrangements of parts (and steps), which have been herein described and illustrated in order to explain the nature of the invention, may be made by those skilled in the art within the principle and scope of the invention as expressed in the appended claims.

We claim:

1. A ring for fairings or the like for use with cable-like means comprising, in combination:
   a layer of rigid material;
   a layer of resilient material; and
   adhesive means,
      said layer of resilient material being wrapped around the outer circumference of said cable-like means and bonded thereto with said adhesive means, and said layer of rigid material being wrapped around said layer of resilient material and bonded thereto with said adhesive means,
      said layer of rigid material being formed with a joint line at which a fastening of the layer is made, said ring supporting one of said fairings as the cable is towed through water.

2. A supporting ring as in claim 1, wherein the edges of said rigid material overlap at said joint line and the manner in which said layer-fastening is made is welding.

3. A supporting ring as in claim 1, wherein said rigid and resilient materials are highly resistant to corrosion by sea water.

4. A supporting ring as in claim 2, wherein said rigid and resilient material are highly resistant to corrosion by sea water.

5. A supporting ring as in claim 3, wherein said rigid material is stainless steel and said resilient material is a nitrile rubber compound.

6. A supporting ring as in claim 5, wherein said nitrile rubber compound is formed from the following ingredients:

| Ingredient: | Concentration, phr. |
|---|---|
| Butadiene-acrylonitrile copolymer _____ | 100 |
| Carbon black _____ | 60 |
| Zinc oxide _____ | 5 |
| Stearic acid _____ | 1 |
| Magnesium oxide _____ | 4 |
| Di-ortho-tolylguanidine _____ | 0.5 |
| 2-mercaptobenzothiazole _____ | 1.5 |
| Sulphur _____ | 2 |

References Cited

UNITED STATES PATENTS

| | | | |
|---|---|---|---|
| 2,509,145 | 5/1950 | Henshaw _____ | 287—85 |
| 2,711,383 | 6/1955 | Ruggeri et al. _____ | 156—314 |
| 3,060,886 | 10/1962 | Rather et al. | |

MILTON BUCHLER, *Primary Examiner.*

TRYGVE M. BLIX, *Assistant Examiner.*